United States Patent
Ornelas Gutierrez et al.

(10) Patent No.: US 8,853,119 B2
(45) Date of Patent: Oct. 7, 2014

(54) UNSUPPORTED AND SUPPORTED PROMOTED RUTHENIUM SULFIDE CATALYST WITH HIGH CATALYTIC ACTIVITY FOR HYDROCARBON HYDROTREATMENTS AND ITS METHOD

(75) Inventors: Carlos Elias Ornelas Gutierrez, Chihuahua (MX); Lorena Alvarez Contreras, Chihuahua (MX); Jose Rurik Farias Mancilla, Chihuahua (MX); Alfredo Aguilar Elguezabal, Chihuahua (MX)

(73) Assignee: Centro de Investigacion en Materiales Avanzados, S.C, Chihuahua (MX)

( * ) Notice: Subject to any disclaimer, the term of this patent is extended or adjusted under 35 U.S.C. 154(b) by 261 days.

(21) Appl. No.: 13/444,534

(22) Filed: Apr. 11, 2012

(65) Prior Publication Data
US 2013/0157842 A1 Jun. 20, 2013

(30) Foreign Application Priority Data
Dec. 14, 2011 (MX) .................. MX/a/2011/013531

(51) Int. Cl.
B01J 27/02 (2006.01)
B01J 27/045 (2006.01)
B01J 27/047 (2006.01)

(52) U.S. Cl.
USPC ........................ 502/223; 502/216; 502/219

(58) Field of Classification Search
USPC ........................................ 502/216, 219, 223
See application file for complete search history.

(56) References Cited

U.S. PATENT DOCUMENTS

| 3,055,840 | A | * | 9/1962 | Koch, Jr. ................... 502/174 |
| 4,279,737 | A | * | 7/1981 | Chianelli et al. ............ 208/217 |
| 4,288,422 | A | * | 9/1981 | Chianelli et al. ............ 423/509 |
| 5,248,648 | A | * | 9/1993 | Breysse et al. ............... 502/223 |
| 5,997,840 | A | * | 12/1999 | Van Brussel et al. ......... 423/659 |
| 6,299,760 | B1 | * | 10/2001 | Soled et al. ............... 208/254 H |
| 6,426,437 | B1 | * | 7/2002 | Shum ........................... 568/862 |
| 6,967,185 | B2 | * | 11/2005 | Allen et al. ................. 502/216 |

(Continued)

FOREIGN PATENT DOCUMENTS

| CN | 1693215 | * 11/2005 | ............ C01G 55/00 |
| CN | 1693216 | * 11/2005 | ............ C10G 55/00 |

OTHER PUBLICATIONS

"Nanoparticles of Amorphous Ruthenium Sulfide Easily Obtainable from a TiO2-Supported Hexanuclear Cluster Complex [RuxC(CO)16]2-: a Highly Active Catalyst for the Reduction of SO2 with H2," Atsushi Ishiguro et al. Chem. Eur J. 2002, 8, No. 14, pp. 3260-3268.*

(Continued)

Primary Examiner — Patricia L Hailey
(74) Attorney, Agent, or Firm — Defillo & Associates, Inc; Evelyn A. Defillo

(57) ABSTRACT

The present invention relates to synthesis method of a family of ruthenium sulfide catalysts promoted with an added additional metal, unsupported (M/RuS$_2$) and supported (M/RuS$_2$/support). The obtained catalysts exhibit a high catalytic activity in hydrotreating or hydroprocessing (HDT) of hydrocarbons, mainly hydrodesulfuration, hydrodenitrogenation, and hydrodeoxigenation. The impact of the present invention for application in the commercial context, lies in the high catalytic activity of the obtained catalysts, which is far superior to the existing commercial catalysts, as well as the simplicity of the synthesis method, which will affect the quality of the products obtained in the oil industry, allowing to meet the environmental standards imposed by current legislations.

16 Claims, 4 Drawing Sheets

(56) References Cited

U.S. PATENT DOCUMENTS

| | | | |
|---|---|---|---|
| 7,754,068 B2* | 7/2010 | Menegassi De Almeida et al. | 208/210 |
| 7,772,445 B2* | 8/2010 | Chen et al. | 568/814 |
| 7,812,251 B2* | 10/2010 | Islam et al. | 136/263 |
| 7,880,025 B2* | 2/2011 | Touge et al. | 556/12 |
| 7,893,290 B1* | 2/2011 | Schapp et al. | 556/136 |
| 7,928,257 B2* | 4/2011 | Katsuki et al. | 556/137 |
| 7,932,411 B2* | 4/2011 | Touge et al. | 556/136 |
| 8,372,775 B2* | 2/2013 | Gulla et al. | 502/185 |
| 2010/0167915 A1* | 7/2010 | Mohajeri et al. | 502/159 |
| 2010/0193402 A1* | 8/2010 | Li et al. | 208/134 |
| 2010/0292486 A1* | 11/2010 | Hoveyda et al. | 548/101 |

OTHER PUBLICATIONS

"Synthesis and characterization of RuS2 nanocrystallites," M. Ashokkumar et al. Journal of Materials Science 30 (1995), pp. 2759-2764.*

"Sonochemical synthesis of nanocrystallites of ruthenium sulfide, RuS1.7," P. Jeevanandam et al. J. Mater. Chem., 2000, 10, pp. 2769-2773.*

* cited by examiner

UNSUPPORTED AND SUPPORTED PROMOTED RUTHENIUM SULFIDE CATALYST WITH HIGH CATALYTIC ACTIVITY FOR HYDROCARBON HYDROTREATMENTS AND ITS METHOD

OBJECTIVE OF THE INVENTION

The present invention relates to a method for the synthesis of a family of ruthenium promoted catalysts, this mean, with an added additional metal, unsupported ($M/RuS_2$) and supported ($M/RuS_2$/support). The obtained catalysts exhibit a high catalytic activity in hydrotreatment reactions or hydroprocessing (HDT), mainly hydrodesulfurization (HDS), hydrodenitrogenation and hydrodeoxigenation of hydrocarbons.

The impact of the present invention for its application in the commercial area, reside in the high catalytic activity of the obtained catalysts, superior to the existing commercial catalysts, as well as the simplicity of the synthesis method, which will affect the quality of the obtained products in the oil industry, allowing to concur with the environmental standards imposed by current legislation.

BACKGROUND

Due to the high demand for hydrocarbons, the quality of the petroleum extracted worldwide has declined with the passage of time, since the hydrocarbons considered of high quality known as light crude oils, characterized by its greater amount of gasoline, low resin and low sulphur become limited, increasing the need for using the deposits of heavy crude oils that are distinguished by a greater proportion of undesirable components, such as sulfur, nitrogen, oxygen and metals, which produce greater amounts of pollutants and complicate the refining process.

In addition, the great technological and environmental problems generated by the presence of sulphur in the hydrocarbons combustion, have required current laws of developed countries to demand for low sulphur content in fuels such as gasoline and diesel, reducing the permitted sulphur content dramatically in a few years, reaching levels of 10 ppm in 2010.

The legislation to regulate the sulphur content allowed in fuels, together with the raw material processing of increasingly lower quality, has generated great difficulties in the hydrotreatment processes, wherein current catalysts have not been able to meet the strict requirements, being unable to treat more refractory molecules and as a result it is practically impossible for these to reach the imposed laws; consequently the need for the use of catalysts with optimized properties or new more active and selective catalysts are currently the greater challenge.

The hydroprocessing or hydrotreatment (HDT) processes, encompassed in the petroleum refining industry, wherein usually the separation of the highest proportion of contaminants is carried, have been using transition metal sulfides catalysts. More specifically, for a long period of time molybdenum has been the material in which the investigation of HDT has been focused. Currently, the science for the HDT catalysts and more specifically for hydrodesulfurization (HDS), has advanced a lot for the understanding of molybdenum based catalysts. Thus, emerging bimetallic catalysts, trimetallic catalysts, and the last generation of unsupported catalysts called NEBULA, with very complex synthesis processes but which offer considerable advantages over their predecessors. However, the exhaustive removal of heteroatoms in heavy fractions of petroleum remains a challenge, since it has been found that conventional catalysts for HDT are not sufficiently effective for this purpose.

In studies conducted by Pecoraro T. A., Chianelli R. R., 1981. Journal of Catalysis, 67 Issue 2, pp. 430-445; Shafia R., Hutchings G. J., 2000. Catalysis Today, 59 pp. 423-442; Grange P., Vanhaeren X., 1997. Catalysis Today, 36, pp. 375-391; Chianelli R. R., Berhault g., Raybaud P., Kasztelan S., Hafner J., H. Toulhoat, 2002. Applied Catalysis A: General, 227, pp. 83-96 and Chianelli R. R., Berhault G., B. Torres, 2009. Catalysis Today, 147, pp. 275-286, have show that unsupported ruthenium sulfide is a material that presents high activity, surpassing the traditional molybdenum sulfide catalyst and making it an excellent candidate to meet current requirements.

It is well known that the catalytic properties of a material depend greatly from its synthesis, as in the case of the catalysts called STARS, where an appropriate impregnation method allows a considerable improvement in the catalytic activity of the material (Song C., 2003. An overview of new approaches to deep desulfurization for ultra clean gasoline, diesel fuel and jet fuel. Catalysis Today, 86, pp. 211-263). It is why the features of the catalyst are of vital importance for their performance in the catalysts; thus, catalysts with low crystallinity (greater amount of defects which are usually active sites), high surface area (most exposed active sites) usually affect the catalytic activity of the material, resulting in materials being catalytically more active. These characteristics are obtained in the material synthesis; it is for this reason that starting from an appropriate precursor and with an appropriate decomposition/activation method, it is possible to generate a sulfide ruthenium catalyst with high catalytic activity.

The best catalysts in the HDS at the end of XX century were catalysts of sulfide of cobalt and molybdenum supported in alumina commonly known as CoMo/Alumina; nevertheless, Exxon Mobil-Albernate reported a new generation of commercial catalysts called STARS (Sites of Super Active Reaction Type II) which are catalysts of CoMo/Alumina and NiMo/Alumina, that are synthesized using a new alumina support base and a special technique of incorporation of the promoter (Co or Ni) which allows a very great and uniform dispersion of the metals in the support with moderate density. This catalysts family quickly exceeded the traditional CoMo/Alumina catalysts due to their capacity of sulphur removal especially steric hindered molecules (Song C., 2003. An overview of new approaches to deep desulfurization for gasoline, diesel engine fuel and jet fuel. Catalysis Today, 86, pp. 211-263). Subsequent to this great advance in the catalysts synthesis technology, at the beginning of this decade Exxon Mobil-Albemarle showed a similar development to the obtained by the STARS catalysts which were obtained thanks to the new catalyst called NEBULA (New Bulk Activity), which is an unsupported catalyst of NiCoMo without the use of a support, that allows a high performance in the quality of products like low sulphur content, high cetane, low density, etc. (Soled, Stuart L., Miseo, Sabato, Krycak, Roman, Vroman, Hilda, Ho, Teh C., Riley, Kenneth L., 2001. Nickel molybdtungstate hydrotreating catalysts (law444). U.S. Pat. No. 6,299,760; Meijburg G., 2001. Production of Ultra-low-sulfur Diesel in Hydrocracking with the Latest and Future Generation Catalysts. Catalyst Courier, 46, Akzo Nobel; Song C., 2003. An overview of new approaches to deep desulfurization for ultra-clean gasoline, diesel engine fuel and jet fuel. Catalysis Today, 86, pp. 211-263).

In summary, due to the legal requirements, technological and environmental, which reduce more and more the level of fuel emissions mainly allowed in combustibles, the generation of a more efficient catalytic system in HDS is the challenge. Currently, the catalysts used at the industrial level are based on molybdenum, supported and promoted by one or more transition metals (TM). Considering these regulations and the characteristics of the present catalysts, it becomes evident that the development of a new catalysts family with high catalytic activity is necessary. The most direct option is with the synthesis of ruthenium based catalysts. In this sense, a catalyst that offers high catalytic activity with a simple synthesis method may be the solution to the problems faced by the petrochemical industry.

Complex ruthenium precursors and other metals have been successfully synthesized thanks to the facility that presents the metals to form complexes. Thus, different ruthenium complex compounds have been synthesized and patented such as:

The United States Patent Publication Application No. 20030045737 that shows the synthesis of ruthenocene, ruthenocene cyclopentadienyl or indenyl ruthenocene, from a cyclopentadienyl compound or indenil with ruthenium chloride III hydrated and magnesium dust.

The U.S. Pat. No. 7,893,290 that shows the synthesis of an organometallic complex with formula $M(RPD)_2$, where M is iron, ruthenium or osmium; R is hydrogen or an aryl group with 1 to 4 carbon atoms and PD is a cyclic or open chain of a dienyl system that forms a complex type sandwich. This precursor is used to make thin films.

U.S. Pat. No. 7,928,257 shows a method for the production of a ruthenium complex of formula (Ru(Salen)(CO) of very complex structure for optical uses.

U.S. Pat. No. 7,928,257 shows the synthesis of organometallic complexes of very complex structures with cyclic compounds, radical groups, nitrogen and ligands, these complexes types have important applications in electroluminescence devices.

U.S. Pat. No. 7,812,251 shows the synthesis of a transition metal complex of formula $MLY^1$, where M is a transition metal like ruthenium, L is binding of polypyridine and $Y^1$ is a functional group that can have more than 50 carbon atoms, nitrogen or oxygen. This complex has important uses in photovoltaic cells.

Also the ruthenium complexes have been used as catalytic and we found the following patent documents:

U.S. Pat. No. 7,880,025 shows a method to produce a ruthenium complex of formula $[RuX_2(L^1)]_2$ where X represents a halogen atom and $L^1$ represent an aromatic complex compound with 8 radical groups. With uses in catalysts for the hydrogenation process.

U.S. Pat. No. 7,932,411 shows a method to produce an ruthenium complex with formula $[RuX_2(L^2)]_n$ where X represents a halogen atom, $L^2$ represents an aromatic compound and n is a natural number of 2 or more. Starting from the reaction of $[RuX_2(L^1)]_2$ (U.S. Pat. No. 7,880,025) and $L^2$. This ruthenium complex is also applied for the catalytic process of hydrogenation.

U.S. Pat. No. 7,772,445 shows a process for the reduction of composed with double carbon oxygen bond from a complex ruthenium-aryl-aminophosphine complex in the presence of a base. The ruthenium compound follows formula $[RuX(A)(PNH_2)]X$ where A is $C_{6-14}$ an aryl or heteroaryl or an aromatic group of substituted $C_{6-10}$, $(PNH_2)$ represents an aminophosphine ligand of formula $R^3R^4P-L-NH^2$, where $R^3$, $R^4$ and L are radical complexes.

U.S. Pat. No. 6,426,437 shows a process to produce 1,4-butanediol with catalyst of rhodium complex, ruthenium complex and bidentate diphosphine ligand, wherein the ruthenium complex includes a ruthenium link to a ligand of the group of halides, hydrides, carbonyl, trialkyl or triaryl, phosphines, 2-4 alkanedionates and replaced and not replaced cyclopentadienyl.

U.S. Pat. No. 5,997,840 shows a method for the synthesis of a solid chiral catalyst of Zeolite BEA as support and a metal-binap complex. The complex can be of ruthenium or other metals and includes in a complex of 2,2'bis(diphenylphosphino)-1,1'-binaphthyl))-M(R) where R can be an enantiomer. Finding good activity for production of pure enantiomers.

United States Patent Application Publication No. 20100292486 shows an organometallic complex compound synthesis of ruthenium as highly active catalysts for ring-closing metathesis (RCM), rings-opening (ROM) and cross methateses (CM) reactions, these compounds are synthesized from monomeric molecules with ligands that contain substitute molecules as 1,3-dimesithyl-4,5-dihydroimidazol-2-ylidene and styrenyl to ether ligands.

U.S. Pat. No. 6,696,608 shows a process for the transference of hydrogen with a complex catalyst with transition metals of transition of the VIIIB.

United States Patent Application Publication No. 2010/0167915 shows a nanocatalyst synthesis for hydrodesulfuration where the support is a nano-structured porous carbonaceous compound, as: carbon nanotubes, carbon nano-fibers, carbon nanoporous, carbon nano-norn, carbon nano-tubes fibers, or any combination of them with at least a metal of VIIIB family and one of the 6B family and although never mentions to ruthenium, claims the VIIIB family.

United States Patent Application Publication No. 20100193402 shows the synthesis of a catalytic metal oxide composite, which is designed of at least a metal of group VIIIB and at least two metals of group VIB. Basically, they are trimetallic catalysts that claims the VIIIB family.

U.S. Pat. No. 7,754,068; the patent applications of the same country, the 201000288494 and 20100230323 and WO2011014553, claim the use of catalysts of VIB and VIIIB families without mentioning the ruthenium.

In the present invention synthesizes a ruthenium complex compound to be used as a precursor for the synthesis of catalysts for the HDS of hydrocarbons.

Thus, the present invention from the commercial point of view represents great advantages for having a very simple synthesis method of the precursory ruthenium complex which will affect in the catalyst cost, which is decomposed and activated by a process and infrastructure typically used for the activation of conventional catalysts; these two simple steps provide a catalyst with very high catalytic activity that allows to reach the high imposed requirements.

The catalytic activities achieved by the present invention are superior to the industrial catalyst, even greater than the current most active commercial unsupported catalyst.

DETAILED DESCRIPTION OF THE INVENTION

Figure 1:
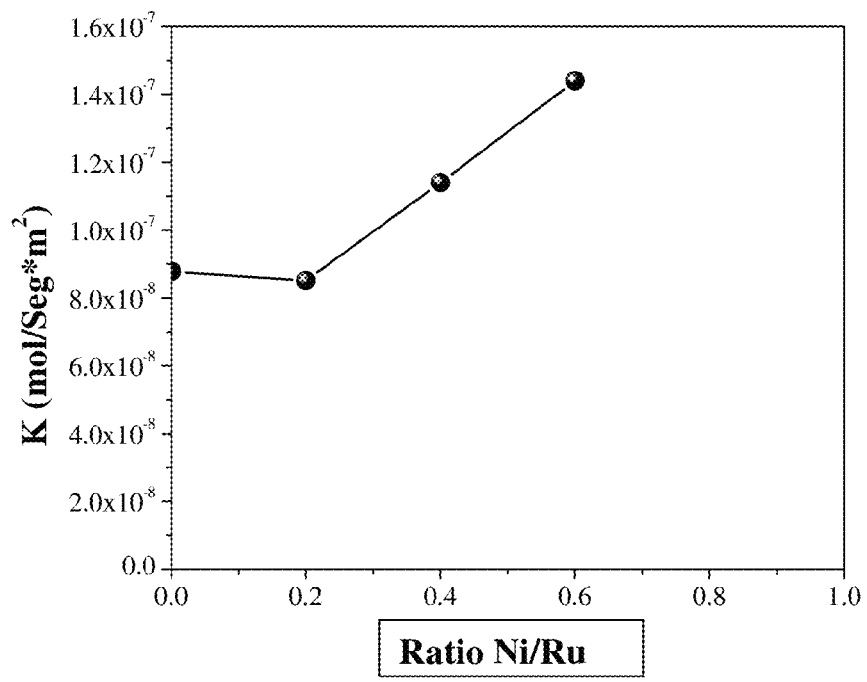
FIG. 1 shows a graph illustrating the measurements of the specific catalytic activity in the reaction of hydrodesulfurization (HDS) of the dibenzothiophene (DBT) of the promoted catalysts by different amounts of nickel, synthesized by the impregnation method, activated in controlled atmosphere of $H_2/H_2S$ (85:15% vol).

The present invention relates to a synthesis method of a family of ruthenium sulfide catalysts that starts with the synthesis of a family of precursors of promoted ruthenium sulfide complex, this mean, with an additional added metal $M_W/RuN_xR_{4x}Cl_{3+Z}$ where M is one or more transition metals of group VIB or VIIIB, X and Z have values from 0 to 10 and W has values from 0.01 to 3 or value of 0 for the promotion by impregnation; the values of X and Z depend on the precursor synthesis conditions and the value of W of the amount of the promoter (M).

The synthesis of catalysts for the promoted ruthenium sulfide ($M_w/RuS_2$), this mean, with one or more transition metals of the group VIB and VIIIB (M), from the activation of the ruthenium base complex, with different activation conditions; allows to obtain unsupported promoted catalysts whose active component is $M_w/RuS_2$ and supported where the active component is $M_w/RuS_2$ incorporated on a support; which exhibit a high catalytic activity in hydrotreatment reactions or hydroprocessing (HDT), mainly hydrodesulfuration, hydrodenitrogenation and hydrodeoxigenation of hydrocarbons. The method includes a series of steps that starts from obtaining a family of promoted ruthenium complex precursors with different activation conditions, which provides unsupported catalysts with a superficial area from 40 to 250 m²/g and a high amount of active sites.

To obtain the family promoted ruthenium complex precursors and subsequently the ruthenium sulfide catalysts follow the following steps:

a) dissolving hydrated ruthenium chloride in a solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof; where R1 is equal to OH or to a lineal chain or branched radical C1 to C8, R2 is equal to H, a lineal chain or branched radical C1 to C8, with relation 0.01 to 40 ml of solvent per gram of salt preferably dissolved in methanol, ethanol or acetone.

b) dissolving ammonium chloride in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof; where R1 is equal to OH, a lineal chain or branched radical C1 to C8, R2 is equal to H or to a lineal chain or branched radical C1 to C8, with relation 0.01 to 40 ml of solvent per gram of salt preferably dissolved in water, methanol, ethanol, acetone or one combination thereof.

c) dissolving an inorganic salt of transition metals of the group VIB or VIIIB such as chlorides and nitrates of metal, preferably a metal chloride $MCl_y$, where the value of y depends on the metal, with a ratio of the metal group VIB or VIIIB to the ruthenium from 0.01 to 3, preferably 0.1-0.6, in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination; where R1 is equal to OH or to a lineal or branched radical C1 to C8 and R2 is equal to H or to a radical of straight-chain or branched C1 to C8, with relation 0.01 to 40 ml of solvent per gram of salt, preferably dissolved in water, methanol, ethanol, acetone, or a combination.

d) adding solution of b) in a molar relation of 1:1 to 10:1 of $NH_4Cl$ to $RuCl_3$ preferably 3-6:1 to the solution of a), maintaining in mechanical agitation between 100 to 700 rpm during the addition and up to 30 minutes after this has finished.

e) adding $NH_4OH$ or HCl in proportion of 0.01 to 2 ml per gram of ruthenium chloride.

f) adding to the solution of step d) or e) according to the case, a R3COR4 or R3COOR5 compound, where R3 is a linear chain or branched radical C1 to C8, R4 is equal to H or a linear chain or branched radical C1 to C8 and may include 1 or 2 oxygen atoms or 1 nitrogen atom, R5 is equal to a hydrogen radical or a linear chain or branched radical C1 to C10; preferably R3 is equal to a linear radical C1 to C2, R4 is equal to a radical H or to a linear radical C1 to C2 and R5 is equal to a radical H or to a linear radical C1 to C5, that may include 1 nitrogen atom or 2 oxygen atoms in relations of 0.5:1 to 20:1 in volume preferably 2-5:1 volume.

g) leaving to the solution of f) in mechanical agitation for 30 minutes between 100-700 rpm and resting time from 0.1 to 3 hours to allow a suitable crystallization; a family of promoted ruthenium complex compounds very soluble in water and sparingly soluble in acetone is produced and precipitated, these compounds have typical decomposition temperatures above 200° C. and total decomposition to metallic charge ($M_w$/Ru) in inert atmosphere to temperatures lower than 485° C. The precipitate is filtered and washed with acetone. Precursors with conversions between 28 and 99% are obtained, depending on the X and Z values in equation 1.

$MCl_y + RuCl_3 + NH_4Cl \rightarrow M_W/RuN_xH_{4x}Cl_{3+Z} +$
$H_2S \rightarrow M_W/RuS_2$ 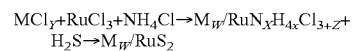Equation 1 h) For the incorporation of the ruthenium complex to the support can be used the method of incipient impregnating or wet impregnating that comprises of placing a support bed that may be of $TiO_2$, zeolitic supports, mesostructured supports such as MCM-41, SBA-15, alumina, silica, mixed oxides or a combination thereof; doped or not doped. These supports also include the nanometric form of the same and are impregnated with a solution of the precursory complex in weight relation 1-90% of dissolved metallic charge in the minimum amount of solvent, the addition is carried out by dripping the solution to impregnate over the catalyst until filling all their porosity, incipient impregnating or moistening the catalyst, wet impregnating. For the impregnating, the solvents used are R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof; where R1 is equal to OH, or a lineal chain or branched radical C1 to C8 and R2 is equal to H, or a lineal chain or branched radical C1 to C8, with relation 0.01 to 40 ml of solvent per gram of precursor, preferably dissolved in water, methanol, ethanol, acetone or one combination thereof.

The ruthenium precursor complex whether it is going to be used as unsupported catalytic (equation 1) or as supported (impregnated in a support) is decomposed and activated in one step. For this, temperatures are used from 350° C. to 550° C., preferably 400-450° C., with a heating rate from 2 to 50° C. per minute, preferably 2-10° C. per minute; under pressure of 1 atm, in a reducing atmosphere of a gas mixture formed by $H_2S/G$ where G may be $H_2$, $N_2$, Ar or He; in $H_2S$ concentrations from 2 to 99% preferably 2-15% or 80-99%. The synthesized catalyst is kept in an inert nitrogen atmosphere.

For obtaining promoted catalysts by the impregnating method, the promoter is incorporated to the unsupported or supported ruthenium sulfide by the method of incipient impregnation or wet impregnation, that consists in placing on an unsupported or supported ruthenium sulfide catalyst and impregnate the solution of c) according to equation 2; the addition of the promoter is carried out by dripping of the solution over the catalyst until filling all the porous (incipient impregnating) or wetting the catalyst (wet impregnating). After the impregnation, the catalyst is activated again using the method of i).

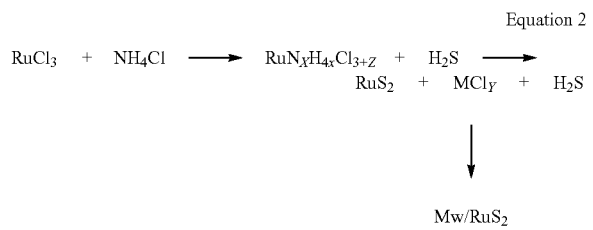

Equation 2

For the incorporation of the promoter by using the method of co-synthesis 1, which consists of forming a bimetallic complex precursor and activating it according to the equation 3, the solution of c) is added to the solution of a) keeping mechanical agitation between 100 to 700 rpm during the addition and follows by the procedure of d) replacing the solution of a) by the mixture of the solutions of c) and a).

$$(MCl_Y+RuCl_3)+NH_4Cl \rightarrow M_W/RuN_XH_{4x}Cl_{3+Z}+H_2S \rightarrow M_W/RuS_2 \quad \text{Equation 3}$$

For the incorporation of the promoter by using the method of co-synthesis 2, which consists of forming a bimetallic complex precursor and activating it according to the equation 4, the solution of c) is added to the solution of b) keeping mechanical agitation between 100 to 700 rpm during the addition and following by the procedure of paragraph d) replacing the solution of b) by mixture of the solutions of c) and b).

$$RuCl_3+(MCl_Y+NH_4Cl) \rightarrow M_W/RuN_XH_{4x}Cl_{3+Z}+H_2S \rightarrow M_W/RuS_2 \quad \text{Equation 4}$$

For the incorporation of the promoter by using the method of co-synthesis 3, which consists of forming a bimetallic complex precursor and activating it according to the equation 5, the solution of c) is added to the ruthenium complex precursor obtained following the procedure of a) to g), wherein the ruthenium complex precursor formed in g) is dissolved in a solvent R1COR2, R2-OH, $C_4H_8OR$ (THF), $C_4H_8O_2$, $CH_2Cl_2$ (DMC), $C_2H_3N$ (MeCN), $C_3H_7ON$ (DMF), $C_2H_6SO$ (DMSO) or a combination thereof; wherein R1 is equal to OH, or to a radical of lineal or branched chain C1 to C8 and R2 is equal to H, or to a radical of lineal or branched chain C1 to C8, with relation 0.01 to 40 ml of solvent per gram of salt, preferably dissolved in water, methanol, ethanol, acetone, or a combination thereof; the bimetallic complex follows the procedure of h) to supported catalysts and i) for unsupported or supported.

Equation 5

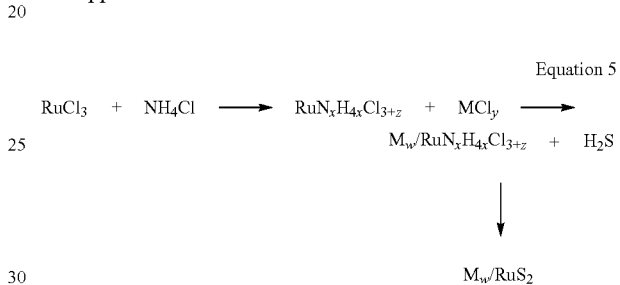

The catalysts are characterized by different techniques and to carry out the evaluation of its catalytic performance they were tested in the hydrodesulfurization reaction (HDS) using the dibenzothiophen model molecule (DBT). The catalyst was introduced in a batch reactor within the high pressure reactor model Parr 4520, with the solution of DBT and the cis and trans mixture of decahydronaphthalene (decalin). This hydrocarbon mixture, was prepared in concentrations of 5% DBT. The reactor was pressurized to 490 psi of $H_2$, warmed up from room temperature to 350° C. and with 600 rpm mechanical agitation. The advance of the reaction was monitored by samples recollection in the liquid phase, taken from the reactor every 30 minutes throughout the reaction time; these samples are collected in small vials, which are analyzed by gas chromatography, in order to determine the constant of the speed reaction. The samples were analyzed in a Perkin-Elmer chromatograph model Auto System XL, equipped with packed column OV-17 3%. To these conditions, commercial catalysts were also tried.

The synthesized catalyst by this method will show a specific superficial area from 40 to 250 $m^2/g$ and low crystallization degree with crystals from 2 to 50 nm, mainly 2-10 nm. The analysis of the product by scanning electron microscopy or transmission electron microscopy show the morphology formation of nanometric particle agglomerates. The catalytic test shows results on selectivity and constant of reaction rate in HDS of DBT exceeding the industrial catalyst test conditions, even more to activate the more active mass commercial catalyst today.

The Table 1 shows the values of M, W, X and Z according to Equation 1 for six precursors ruthenium complex obtained by the method of synthesis co-synthesis 1 varying the amount of the promoter. This is graphically shown in FIGS. 6 and 7.

TABLE 1

| | M | W | X | Z |
|---|---|---|---|---|
| P—Co02—C1 | Co | 0.2 | 7 | 7 |
| P—Co04—C1 | Co | 0.4 | 5 | 5 |
| P—Co06—C1 | Co | 0.6 | 5 | 5 |
| P—Ni02—C1 | NI | 0.2 | 5 | 5 |
| P—Ni04—C1 | NI | 0.4 | 5 | 5 |
| P—Ni06—C1 | NI | 0.6 | 5 | 5 |

EXAMPLES

Example 1

Figure 2:
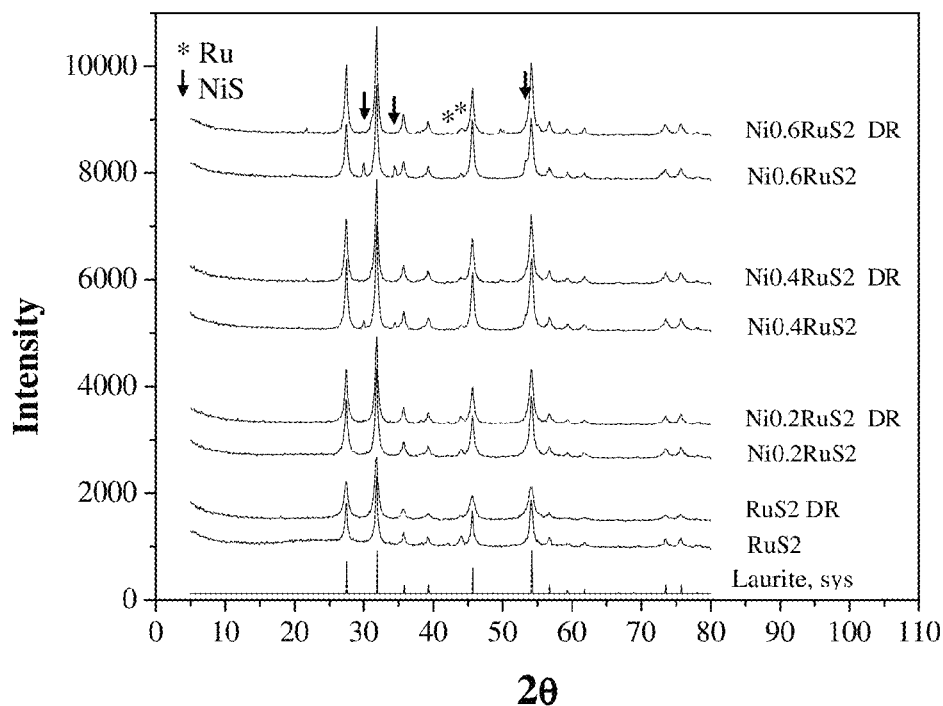
FIG. 2 shows a graph illustrating X-ray diffraction patterns (XRD) before and after the reaction (DR) of the HDS of DBT nickel promoted catalyst, synthesized by the method of impregnation, activated in controlled atmosphere of $H_2/H_2S$ (85:15% vol).

Synthesis of Unsupported Ruthenium Catalysts Promoted with Nickel Sulfide ($M_P/RuS_2$) by Wet Impregnation In two beakers, ruthenium chloride and ammonium chloride are dissolved separately, the ammonium chloride is added to the ruthenium chloride solution with constant mechanical agitation between 100 and 700 rpm for 30 minutes and later acetone is added, the solution is kept in constant mechanical agitation between 100 and 700 rpm by another 30 minutes and 3 hours in rest, later the precipitate is filtered and washed with acetone. The precursor is decomposed and activated in a tubular furnace at 400° C. with heating ratio of 5° C./min for 2 hours in a flow of $H_2/H_2S$ (85:15% vol). Nickel nitrate (Ni/Ru=0.1, 0.2 and 0.6) is dissolved in the minimum amount of water (1 ml/100 mg of nickel nitrate) and added by dripping to the ruthenium sulfide, the catalyst is dried in an oven at temperatures of 60-150° C., preferably 90 to 120° C. for 1.5 hours and then activated in a tubular furnace at 400° C. for 2 hours in a flow of $H_2/H_2S$ (85:15% vol). FIG. 1 shows the graph of the specific catalytic activity of the catalysts promoted by nickel in the reaction of hydrodesulfurization (HDS) of dibenzothiophene (DBT) and FIG. 2 shows the graph of the X-ray diffraction patterns (XRD) of the catalysts before and after reaction (DR).

Example 2

Synthesis of an Unsupported Ruthenium Sulfide Catalyst Promoted with Nickel ($M_P/RuS_2$) W=0.6 by the Method of Co-Synthesis 1

Figure 3:
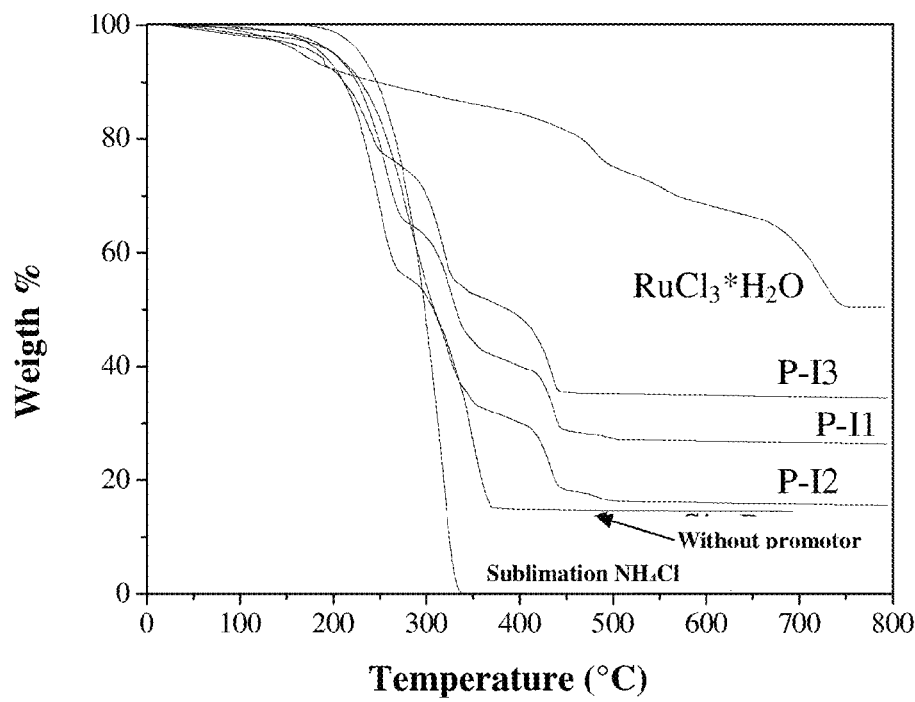
FIG. 3 shows a graph illustrating thermograms obtained by thermogravimetric analysis (TGA) of the three bimetallic precursors of ruthenium complex obtained by the methods of co-synthesis 1 (I1), co-synthesis 2 (I2) and co-synthesis 3 (I3) activated in controlled atmosphere of $H_2/H_2S$ (85:15% vol).
Figure 4:
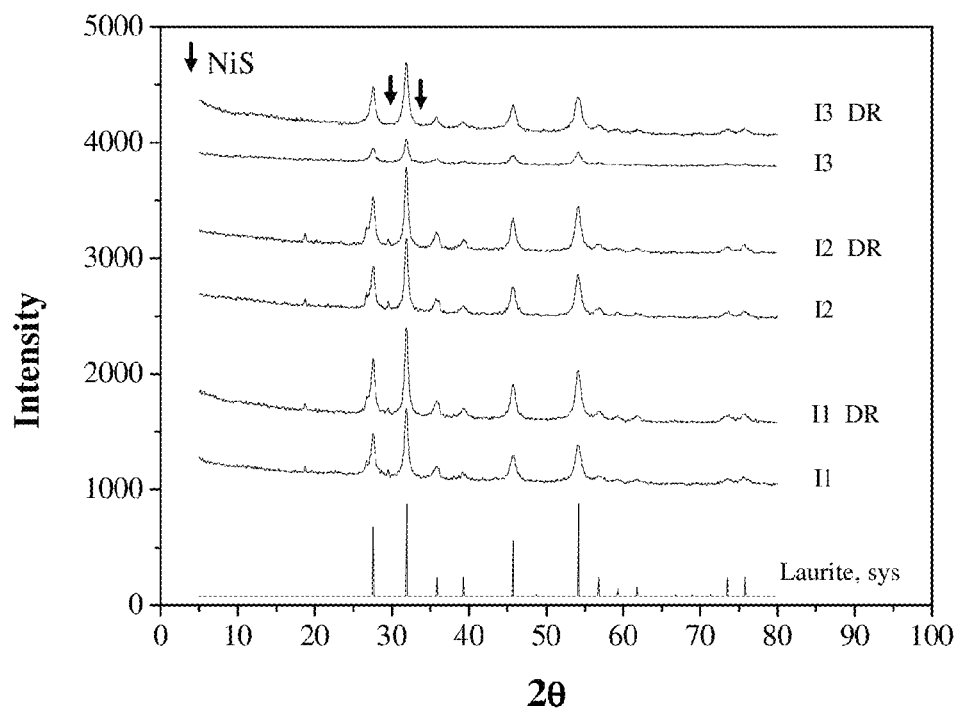
FIG. 4 is a graph illustrating XRD patterns before and after the reaction (DR) of HDS of the DBT catalysts promoted by nickel, by methods of co-synthesis 1(I1), co-synthesis 2 (I2) and co-synthesis 3 (I3) activated in controlled atmosphere of $H_2/H_2S$ (85:15% vol).
Figure 5:
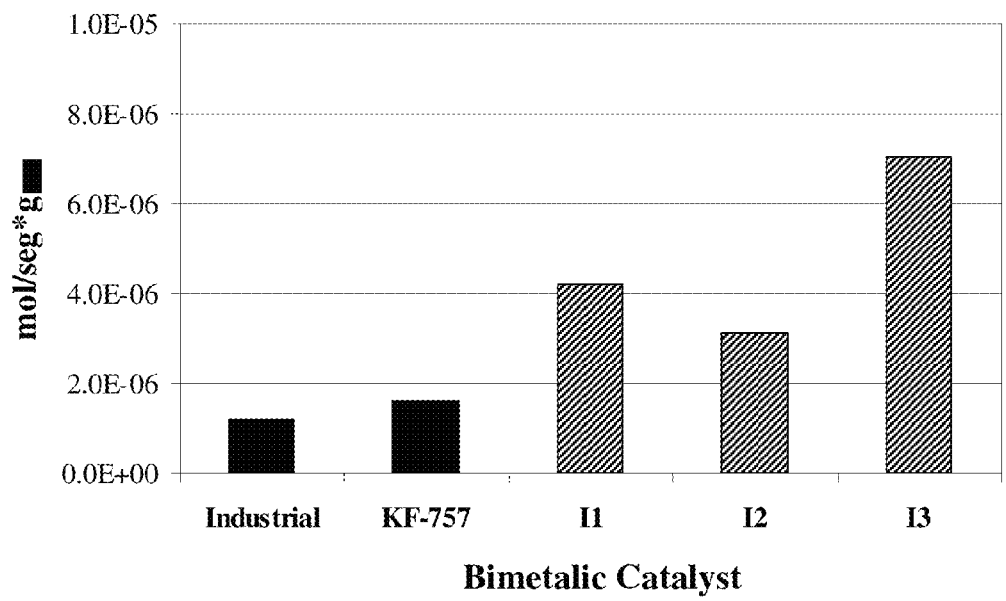
FIG. 5 shows a graph illustrating the catalytic activity measurements of the reaction of HDS of the DBT of the industrial catalyst NiMo/Alumina (industrial) KF 757, and the proposed catalysts of the present invention promoted by different amounts of nickel by the methods of co-synthesis 1 (I1), co-synthesis 2 (I2) and co-synthesis 3 (I3) activated in the controlled atmosphere of $H_2/H_2S$ (85:15% vol).

In two beakers, ruthenium chloride and nickel chloride are dissolved separately, the nickel chloride is added to the ruthenium chloride solution with constant mechanical agitation between 100 to 700 rpm, ammonium chloride in solution is added to the mixture, the solution is kept 30 minutes in constant mechanical agitation for 30 minutes and later acetone is added, the solution is kept again in constant mechanical agitation by another 30 minutes and 3 hours in rest, later the precipitate is filtered and washed with acetone. The bimetallic precursor is decomposed and activated in a tubular furnace at 400° C. with heating ratio of 5° C./min for 2 hours in a flow of $H_2/H_2S$ (85:15% vol). FIG. 3 shows the thermogram obtained by thermogravimetric analysis (TGA) of the bimetallic precursor P-I1 obtained prior to the activation, FIG. 4 shows the XRD pattern of the catalyst I1 obtained by the activation of the precursor P-I1 and FIG. 5 shows the graph of the catalytic activity of the catalyst I1 in the reaction of the HDS of the DBT.

Example 3

Synthesis of an Unsupported Ruthenium Sulfide Catalyst Promoted with Nickel ($M_P/RuS_2$) W=0.6 by the Method of Co-Synthesis 2

In two beakers, ammonium chloride and nickel chloride are dissolved separately, the ammonium chloride is added to the nickel chloride solution with constant mechanical agitation between 100 to 700 rpm, ruthenium chloride in solution is added to the mixture, the solution is kept 30 minutes in constant mechanical agitation for 30 minutes and later acetone is added, the solution is kept again in constant mechanical agitation by another 30 minutes and 3 hours in rest, later the precipitate is filtered and washed with acetone. The bimetallic precursor is decomposed and activated in a tubular furnace at 400° C. with heating ratio of 5° C./min for 2 hours in a flow of $H_2/H_{2S}$ (85:15% vol). FIG. 3 shows the thermogram obtained by thermogravimetric analysis (TGA) of the bimetallic precursor P-I2 obtained prior to the activation, FIG. 4 shows the XRD pattern of the catalyst I2 obtained by the activation of the precursor P-I2 and FIG. 5 shows the graph of the catalytic activity of the catalyst I1 in the reaction of the HDS of the DBT.

Example 4

Synthesis of an Unsupported Ruthenium Sulfide Catalyst Promoted with Nickel Sulfide ($M_P/RuS_2$) W=0.6 by the Method of Co-Synthesis 3

In two beakers, ruthenium chloride and ammonium chloride are dissolved separately, the ammonium chloride is added to the ruthenium chloride solution with constant mechanical agitation between 100 to 700 rpm for 30 minutes and later acetone is added, the solution is kept again in constant mechanical agitation between 100 to 700 rpm, by another 30 minutes and 3 hours in rest, later the precipitate is filtered and washed with acetone. The precursor is again dissolved in a beaker and nickel chloride in solution is added, maintaining the solution in constant agitation between 100 to 700 rpm, for 30 minutes and then acetone is added, the solution is kept again in constant mechanical agitation for another 30 minutes and 3 hours at rest, later the precipitate (P-I3) is filtered and washed with acetone. The bimetallic precursor is decomposed and activated in a tubular furnace at 400° C. with is heating ratio of 5° C./min for 2 hours in a flow of $H_2/H_2S$ (85:15% vol). FIG. 3 shows the thermogram obtained by thermogravimetric analysis (TGA) of the bimetallic precursor P-I3 obtained prior to the activation, FIG. 4 shows the XRD pattern of the catalyst I3 obtained by the activation of the precursor P-I3 and FIG. 5 shows the graph of the catalytic activity of the catalyst I3 in the reaction of the HDS of the DBT.

Example 5

Synthesis of a Promoted Unsupported Ruthenium Sulfide Catalyst ($M_P/RuS_2$) Promoted with a Metal M (M=Co and Ni) by the Method of Co-Synthesis 1

Figure 6:
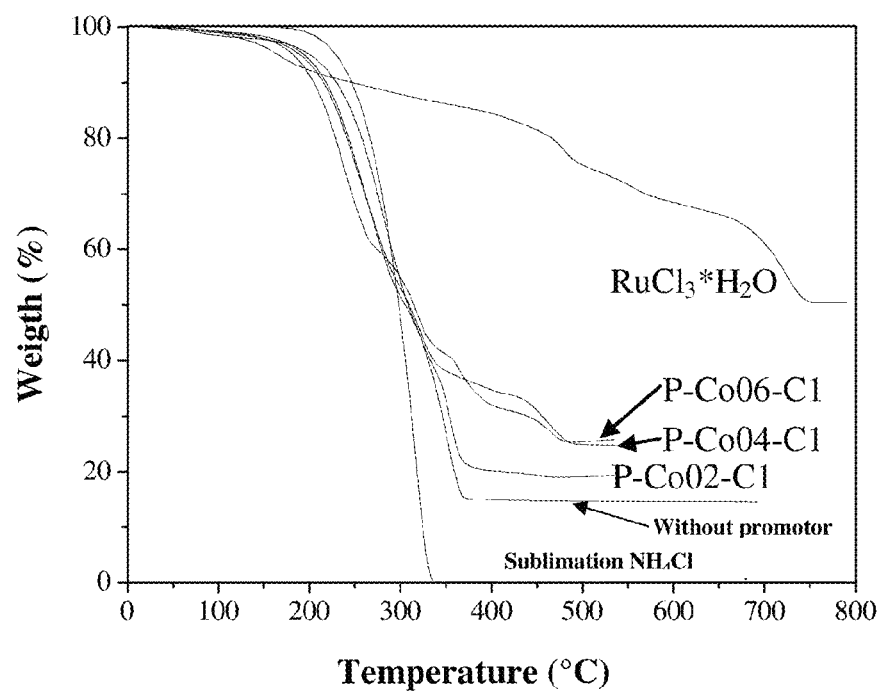
FIG. 6 shows a graph illustrating the thermograms obtained by TGA of three bimetallic precursors ruthenium complex obtained by the method of co-synthesis 1 (I1), with different amounts of cobalt as promoter Co/Ru=0.2 (P—Co02-C1), Co/Ru=0.4 (P—Co04-C1) and Co/Ru=0.6 (P—Co06-C1) activated in controlled atmosphere of $H_2/H_2S$ (85:15% vol).
Figure 7:
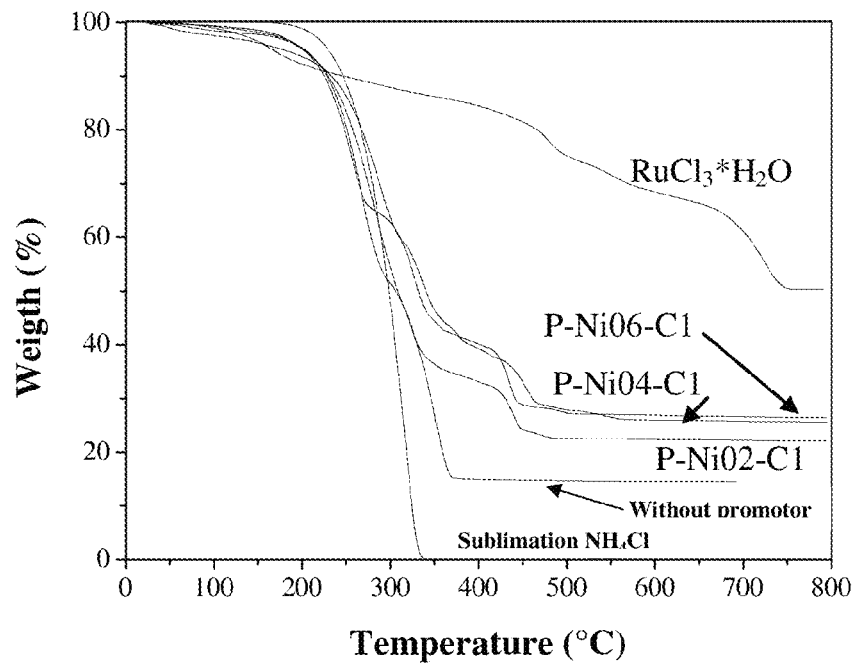
FIG. 7 shows a graph illustrating the thermograms obtained by TGA of three bimetallic precursors of ruthenium complex obtained by the method of co-synthesis 1, with different amounts of nickel as promoter Ni/Ru=0.2 (P—Ni02-C1), Ni/Ru=0.4 (P—Ni04-C1) and Ni/Ru=0.6 (P—Ni06-C1) activated in controlled atmosphere of $H_2/H_2S$ (85:15% vol).
Figure 8:
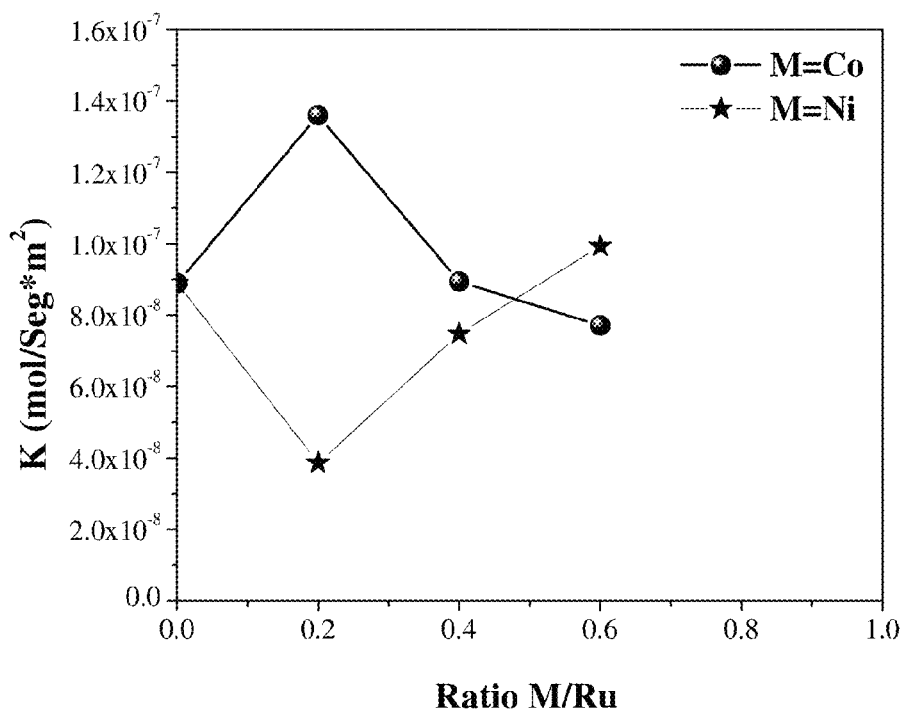
FIG. 8 shows a graph illustrating the specific catalytic activity measurements in the reaction of HDS of the DBT of the catalysts promoted by different metals (Co and Ni) with different amounts of metal M with respect to the ruthenium (M/Ru) where M is cobalt or nickel, synthesized by the method of co-synthesis 1 and activated in controlled atmosphere of $H_2/H_2S$ (85:15% vol).

In two beakers, ruthenium chloride and a metal chloride (nickel or cobalt) are dissolved separately in different concentrations, the metal chloride is added to the ruthenium chloride solution with constant mechanical agitation between 100 to 700 rpm, ammonium chloride in solution is added to the mixture, maintaining constant mechanical agitation for 30 minutes and later acetone is added, the solution is kept again in constant mechanical agitation between 100 and 700 rpm by another 30 minutes and 3 hours in rest, later the precipitate is filtered and washed with acetone. The bimetallic precursor family decomposed and activated in a tubular furnace at 400° C. with its heating ratio of 5° C./min for 2 hours in a flow of $H_2/H_2S$ (85:15% vol). FIGS. 6 and 7 show the thermogram obtained by TGA of the bimetallic precursor family obtained prior to the activation with values of M, W, X, and Z according to Table 1 and FIG. 8 shows the graph of the specific catalytic activity of the catalysts in the reaction of the HDS of the DBT.

The invention claimed is:

1. A synthesis method for a ruthenium sulfide ($RuS_2$) promoted with an additional metal to obtain a family of ruthenium precursory complex to obtain ruthenium sulfide catalysts comprising the steps of:
   a) dissolving hydrated ruthenium chloride in a solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof;
   wherein:
   R1 is equal to OH or a lineal chain or branched radical C1 to C8,
   R2 is equal to H, a lineal chain or branched radical C1 to C8, with relation 0.01 to 40 ml of solvent per gram of salt dissolved in methanol, ethanol or acetone;
   b) dissolving ammonium chloride in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof;
   wherein:
   R1 is equal to OH, a lineal chain or branched radical C1 to C8,
   R2 is equal to H or to a lineal chain or branched radical C1 to C8, with relation 0.01 to 40 ml of solvent per gram of salt dissolved in water, methanol, ethanol, acetone or one combination thereof;
   c) dissolving an inorganic salt of transition metals of groups VIB or VIIIB with a ratio of the transition metal to the ruthenium from 0.01 to 3, in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof,
   wherein:
   R1 is equal to OH or to a lineal or branched radical C1 to C8 and
   R2 is equal to H or to a radical of straight-chain or branched C1 to C8, with relation 0.01 to 40 ml of solvent per gram of salt, dissolved in water, methanol, ethanol, acetone, or a combination thereof;
   d) adding the solution of b) in a molar relation of 1:1 to 10:1 of $NH_4Cl$ to the ruthenium chloride solution to the solution of a), keeping in mechanical agitation between 100 to 700 rpm during the addition and up to 30 minutes after the addition has finished;
   e) adding $NH_4OH$ or HCl in proportion of 0.01 to 2 ml per gram of ruthenium chloride;
   f) adding to the solution of step d) or e) a R3COR4 or R3COOR5 compound, wherein:
   R3 is a linear chain or branched radical C1 to C8,
   R4 is equal to H or a linear chain or branched radical C1 to C8 and include 1 or 2 oxygen atoms or 1 nitrogen atom,
   R5 is equal to a hydrogen radical or a linear chain or branched radical C1 to C10;
   g) leaving to the solution of f) in mechanical agitation for 30 minutes between 100-700 rpm and resting time from 0.1 to 3 hours to allow crystallization; a family of promoted ruthenium complex compounds very soluble in water and sparingly soluble in acetone is produced and precipitated, the family of ruthenium complex compounds have decomposition temperatures above 200° C. and total decomposition to metallic charge ($M_w$/Ru) in inert atmosphere to temperatures lower than 485° C., filtering and washing with acetone the precipitate;
   h) incorporating the ruthenium complex to a support by using a method selected from an incipient impregnating method or a wet impregnating method,
   wherein a support includes: $TiO_2$, zeolitic, and mesostructured supports selected from MCM-41, SBA-15, alumina, silica, mixed oxides, or a combination thereof; doped or not doped, including the nanometric form of the same;
   wherein the support is impregnated with a solution of the precursory complex in weight relation 1-90% of dissolved metallic charge in the minimum amount of solvent,
   wherein during the impregnation, the solution of the ruthenium complex compounds is dripped over the catalyst until filling all porosity, by incipient impregnation or moistening the catalyst, wet impregnation;
   i) decomposing and activating the ruthenium precursor complex at temperatures between 350° C. to 550° C. with a heating rate from 2 to 50° C. per minute; under pressure of 1 atm, in a reducing atmosphere of a gas mixture formed by $H_2S/G$ where G may be $H_2$, $N_2$, Ar or He; in $H_2S$ concentrations from 2 to 99%.

2. The synthesis method according to claim 1, wherein the promoter is incorporated by an impregnation method to the unsupported or supported ruthenium sulfide catalyst by dripping of the solution of step c) over the catalyst until filling all the porous or wetting the catalyst, wherein after the impregnation, the catalyst is activated again following step i).

3. The synthesis method according to claim 2, wherein the method is carried out according to the following equation:

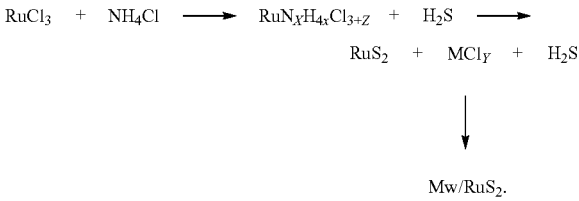

4. The synthesis method according to claim 1, wherein the promoter is incorporated by using a method of co-synthesis 1, the method of co-synthesis 1 includes forming a bimetallic complex precursor and activating the bimetallic complex precursor by adding the solution of step c) to the solution of step a) keeping mechanical agitation between 100 to 700 rpm during the addition and follows by the step d) replacing the solution of step a) with the mixture of the solution of step c) and the solution of step a).

5. The synthesis method according to claim 4, wherein the method is carried out according to the following equation:

$$(MCl_Y + RuCl_3) + NH_4Cl \rightarrow M_W/RuN_XH_{4X}Cl_{3+Z} + H_2S \rightarrow M_W/RuS_2.$$

6. The synthesis method according to claim 1, wherein the promoter is incorporated by using a method of co-synthesis 2, the method of co-synthesis 2 includes forming a bimetallic complex precursor and activating the bimetallic complex precursor by adding the solution of step c) to the solution of step b) keeping mechanical agitation between 100 to 700 rpm during the addition and follows by the step d) replacing the solution of step b) with the mixture of the solutions of step c) and the solution of step b).

7. The synthesis method according to claim 6, wherein the method is carried out according to the following equation:

$$RuCl_3 + (MCl_Y + NH_4Cl) \rightarrow M_W/RuN_XH_{4X}Cl_{3+Z} + H_2S \rightarrow M_W/RuS_2.$$

8. The synthesis method according to claim 1, wherein the promoter is incorporated by using a method of co-synthesis 3, the method of co-synthesis 3 includes forming a bimetallic complex precursor and activating the bimetallic complex precursor by adding the solution of step c) to the ruthenium complex precursor forming in step g), wherein the ruthenium complex precursor formed in the step g) is dissolved in a solvent R1COR2, R2-OH, $C_4H_8OR$ (THF), $C_4H_8O_2$, $CH_2Cl_2$ (DMC), $C_2H_3N$ (MeCN), $C_3H_7ON$ (DMF), $C_2H_6SO$ (DMSO) or a combination thereof;

wherein:
R1 is equal to OH, or to a radical of lineal or branched chain C1 to C8 and
R2 is equal to H, or to a radical of lineal or branched chain C1 to C8, with relation 0.01 to 40 ml of solvent per gram of salt, dissolved in water, methanol, ethanol, acetone, or a combination thereof;
wherein the bimetallic complex follows the procedure of the step h) to supported catalysts and the step i) for unsupported or supported catalyst.

9. The synthesis method according to claim 8, wherein the method is carried out according to the following equation:

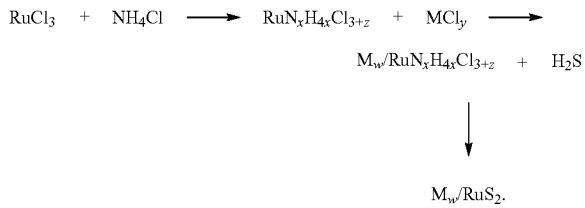

10. The synthesis method according to claim 1, wherein the step g) is carried out according to the following equation:

$$MCl_Y + RuCl_3 + NH_4Cl \rightarrow M_W/RuN_XH_{4X}Cl_{3+Z} + H_2S \rightarrow M_W/RuS_2.$$

11. The synthesis method according to claim 1, wherein the family of ruthenium precursory complexes have the formula:

$$M_W/RuN_XH_{4X}Cl_{3+Z}$$

wherein:
M is one or more transitional metals of group VIB or VIIIB,
X and Z have values from 0 to 10 and
W has values from 0.01 to 3 or value of 0 for promotion by impregnation.

12. The synthesis method according to claim 1, wherein the method provides unsupported promoted catalysts having an active component $M_W/RuS_2$ and supported catalyst having as an active ingredient $M_W/RuS_2$.

13. The synthesis method according to claim 1, wherein the unsupported catalysts include a surface area of 40 to 250 m²/g and a high number of active sites.

14. The synthesis method according to claim 1, wherein the ruthenium sulfide precursor is decomposed and activated by the step i).

15. The synthesis method according to claim 1, wherein the catalyst is incorporated to the support after the step h) by an impregnation method.

16. The synthesis method according to claim 1, wherein, the catalysts are used in reactions of hydrotreating, hydroprocessing (HDT) of hydrocarbons, hydrodesulfuration, hydrodenitrogenation, or hydrodeoxigenation.

\* \* \* \* \*